R. H. BROWNLEE & R. H. UHLINGER.
PROCESS OF MAKING NITROGEN AND CARBON DIOXID.
APPLICATION FILED APR. 7, 1913.
1,154,171. Patented Sept. 21, 1915
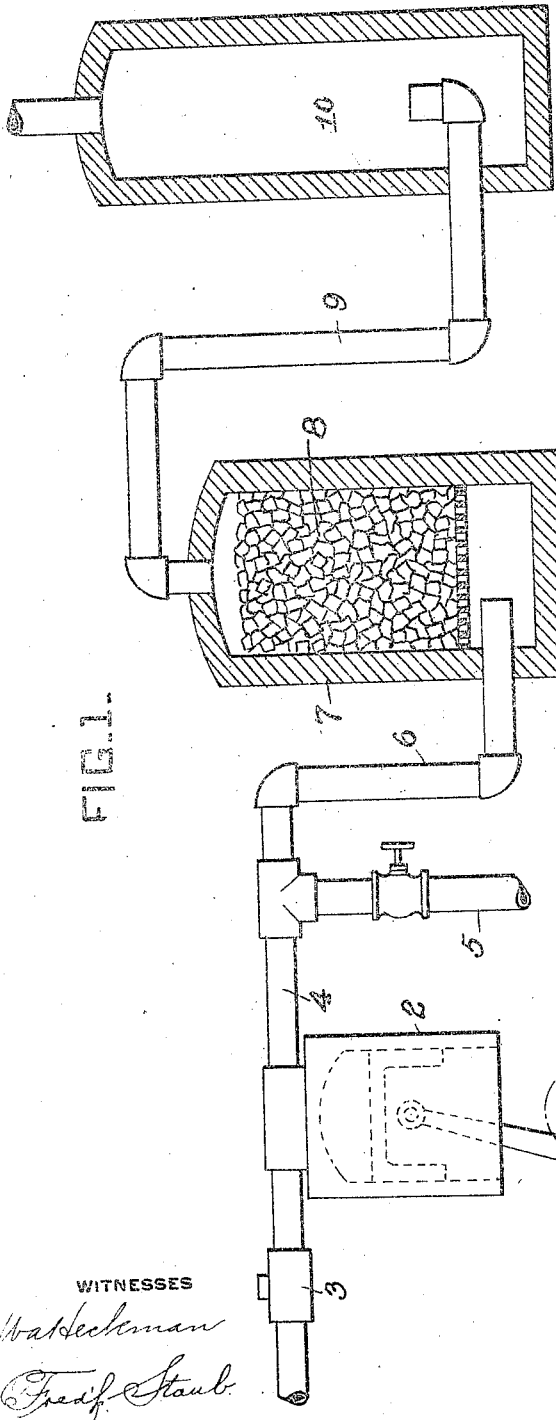
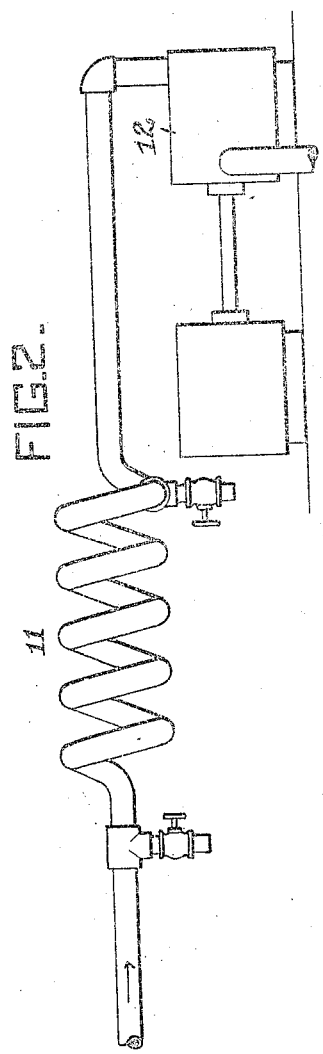

UNITED STATES PATENT OFFICE.

ROY H. BROWNLEE AND ROY H. UHLINGER, OF PITTSBURGH, PENNSYLVANIA, ASSIGNORS, BY MESNE ASSIGNMENTS, TO AMERICAN NITRO-PRODUCTS COMPANY, OF PITTSBURGH, PENNSYLVANIA, A CORPORATION OF DELAWARE.

PROCESS OF MAKING NITROGEN AND CARBON DIOXID.

1,154,171.  Specification of Letters Patent.  Patented Sept. 21, 1915.

Application filed April 7, 1913. Serial No. 759,331.

*To all whom it may concern:*

Be it known that we, ROY H. BROWNLEE and ROY H. UHLINGER, citizens of the United States, residing at Pittsburgh, in the county of Allegheny and State of Pennsylvania, have invented certain new and useful Improvements in Processes of Making Nitrogen and Carbon Dioxid, of which the following is a specification.

Our invention consists of an improved method or process of making nitrogen and carbon dioxid by utilizing the products of combustion of internal combustion or explosion engines, whereby to produce nitrogen and carbon dioxid as by-products of the original fuel, in the manner more fully hereinafter described.

While the process of the invention may be carried out in connection with various designs of mechanism, it will be rendered clear by reference to the accompanying diagrammatic drawing, showing the principal elements employed.

In practising the process any suitable fuel is used, as natural, producer, water, coal, or other carbonaceous gas or volatilizable oil or other suitable carbonaceous substance or hydro-carbon is first mixed with a suitable amount of air, then compressed, and exploded in the explosion chamber or chambers of an internal combustion gas or oil engine, for the production of power, in a well-known manner.

The explosive mixture as supplied to the engine is so proportioned as to its air content, that when combustion has occurred, there will be left in the resulting products of combustion a minimum excess of oxygen and combustible gases. This may be readily effected by adjustment of the mixer. In case, however, that the usual excess of air is admixed with the gas or oil vapor of the hydro-carbon to effect complete combustion, as in the ordinary use of gas engines for the best results as to power, a sufficient quantity of additional reducing gas is supplied to the products of combustion from the engine, and complete combustion of the resulting mixture is then brought about by bringing it into intimate contact with a mass of suitable hot refractory material, as broken bricks, pottery, or platinized asbestos or palladium asbestos, or similar substance. These gases, after such treatment and further combustion are converted into nitrogen and carbon dioxid, and are then passed into and through chambers or absorption towers wherein the carbon dioxid is absorbed for making chemical compounds. This may be done as a means for separating the gas from the nitrogen as for instance, by passing through towers containing calcium oxid and hydroxid (as lime) from which practically pure carbon dioxid may be recovered by heating, or as a step in the manufacture of useful carbonates. The gaseous mixture may also be cooled to separate the water vapor and then compressed and the carbon dioxid liquefied, by suitable treatment in appropriate mechanism, and thus separated from the nitrogen.

By either of the above treatments or steps practically pure nitrogen is produced as the remaining product, and may be utilized in any desired manner.

Referring to the diagrammatic drawing, Figure 1, 2 is an internal combustion engine to which the explosive mixture in suitable proportions is supplied in the usual manner from a mixer 3. The products of combustion pass by waste or exhaust pipe 4, a branch pipe 5 furnishing additional reducing gas, the enriched mixture passing by pipe or conduit 6 to chamber 7 containing refractory material 8, through which the gases pass, effecting complete combustion. The resulting carbon dioxid and nitrogen pass from chamber 7 by conduit 9 to one or more chambers or towers 10 where the carbon dioxid is absorbed, as described.

In Fig. 2, the mixture from the refractory chamber 7 may pass through a cooling coil 11 and into a compressor 12 for liquefaction of the carbon dioxid and resulting separation from the nitrogen.

While the separation of the carbon dioxid and nitrogen are ordinarily desirable, such steps are not essential in all cases. Thus, the mixture, prior to separation, consisting approximately of 90% nitrogen and 10% carbon dioxid, may be used in place of pure nitrogen, for example in fixation of pure nitrogen with hydrogen to make ammonia, when a part of the ammonia will appear as ammonium carbonate, which is a valuable commercial product.

What we claim is:

1. The process of making carbon dioxid and nitrogen consisting in mixing a suitable carbonaceous substance and air, effecting combustion of the mixture in a suitable combustion chamber, passing the products of combustion through a mass of highly heated refractory material to effect complete combustion of the mixture and thus produce a maximum amount of carbon dioxid.

2. The process of making carbon dioxid and nitrogen consisting in mixing a suitable carbonaceous substance with an amount of air in excess of the amount necessary to effect complete combustion, effecting combustion of the mixture in a suitable combustion chamber, adding a sufficient amount of suitable carbonaceous substance to completely combine with the excess of oxidizing gas to produce a maximum amount of carbon dioxid, and then passing such mixture through a mass of highly heated refractory material.

In testimony whereof we hereunto affix our signatures in the presence of two witnesses.

ROY H. BROWNLEE.
ROY H. UHLINGER.

Witnesses:
C. M. CLARKE,
FRED'K STAUB.